US006583194B2

(12) United States Patent
Sendijarevic

(10) Patent No.: US 6,583,194 B2
(45) Date of Patent: Jun. 24, 2003

(54) FOAMS HAVING SHAPE MEMORY

(76) Inventor: Vahid Sendijarevic, 6284 Atkins Dr., Troy, MI (US) 48085

( * ) Notice: Subject to any disclaimer, the term of this patent is extended or adjusted under 35 U.S.C. 154(b) by 0 days.

(21) Appl. No.: 09/993,788

(22) Filed: Nov. 14, 2001

(65) Prior Publication Data

US 2002/0099106 A1 Jul. 25, 2002

Related U.S. Application Data

(60) Provisional application No. 60/249,975, filed on Nov. 20, 2000.

(51) Int. Cl.$^7$ ............................................. C08G 18/42
(52) U.S. Cl. .................... 521/172; 521/170; 521/174
(58) Field of Search ................................ 521/170, 174, 521/172

(56) References Cited

U.S. PATENT DOCUMENTS

| | | | |
|---|---|---|---|
| 4,725,627 A | 2/1988 | Arnason et al. | 521/65 |
| 5,032,622 A | 7/1991 | Herrington et al. | 521/99 |
| 5,049,591 A | 9/1991 | Hayashi et al. | 521/159 |
| 5,066,091 A | 11/1991 | Stoy et al. | 385/98 |
| 5,093,384 A | 3/1992 | Hayashi et al. | 521/159 |
| 5,098,776 A | 3/1992 | Kobayashi et al. | 428/283 |
| 5,145,935 A | 9/1992 | Hayashi | 528/65 |
| 5,155,199 A | 10/1992 | Hayashi | 528/65 |
| 5,192,301 A | 3/1993 | Kamiya et al. | 606/213 |
| 5,418,261 A | 5/1995 | Helsemans et al. | 521/174 |
| 5,441,489 A | 8/1995 | Utsumi et al. | 604/280 |
| 5,445,140 A | 8/1995 | Tovey | 600/117 |
| 5,478,619 A | 12/1995 | Fujikura et al. | 428/36.91 |
| 5,506,300 A | 4/1996 | Ward et al. | 525/88 |
| 5,634,913 A | 6/1997 | Stinger | 604/272 |
| 5,665,822 A | 9/1997 | Bitler et al. | 525/92 |
| 5,902,518 A | 5/1999 | Khazai et al. | 252/511 |
| 5,908,447 A | 6/1999 | Schroeppel et al. | 607/126 |
| 6,024,764 A | 2/2000 | Schroeppel | 623/1 |
| 6,069,319 A | 5/2000 | Davis, Jr. et al. | 174/72 |
| 6,083,442 A | 7/2000 | Gabilly | 264/163 |
| 6,090,479 A | 7/2000 | Shirato et al. | 428/304.4 |
| 6,099,948 A | 8/2000 | Paver, Jr. | 428/304.4 |
| 6,156,842 A | 12/2000 | Hoenig et al. | 525/171 |
| 6,160,084 A | 12/2000 | Langer et al. | 528/272 |
| 2001/0018120 A1 | 8/2001 | Murakami et al. | 428/304.4 |
| 2002/0043736 A1 | 4/2002 | Murakami et al. | 264/45.1 |

FOREIGN PATENT DOCUMENTS

| | | |
|---|---|---|
| EP | 361418 | 4/1990 |
| EP | 365954 | 5/1990 |
| EP | 608626 | 8/1994 |
| JP | 06298988 | 10/1994 |
| JP | 09059418 | 3/1997 |
| JP | 09085840 | 3/1997 |
| JP | 10095058 | 4/1998 |
| JP | 2000248101 | 9/2000 |

OTHER PUBLICATIONS

Tey, et al., "Influence of long–term storage in cold hibernation on strain recovery and recovery stress of polyurethane shape memory polymer foam," Smart Mater. Struc. 10 (2001) 321–325.

Tobushi et al., "Thermomechanical properties of polyurethane–shape memory polymer foam," J. Advanced Sci., 12 (2000) 281–286.

Tobushi et al., "Strain fixity and recovery of polyurethane–shape memory polymer foam," Trans. Mater. Res. Soc. Jpn. (2001), 26(1) (Abstract).

Lee, Bo Sun; "Structure and Thermomechanical Properties of Polyurethane Block Copolymers with Shape Memory Effect," Macromolecules 2001, 34, 6431–6437.

Hayashi, "Properties and Applications of Polyurethane–Series Shape Memory Polymer," International Progress in Urethanes, 6 (1993) 90–115.

Cadogan, "Rigidization mechanisms and materials," Progress in Astronautics and Aeronautics (2001) (Gossamer Spacecraft: Membrane and Inflatable Structures Technology for Space Applications), Chapter 7, pp. 257–279.

Gordon, R.F., Applcations of Shape Memory Polyurethanes,: Proceedings of the First International Conference on Shape Memory and Supereastic technologies, Pacific Grove, California, USA, 1994, pp. 115–120.

Li, F., et al., "Studies on Thermally Stimulated Shape Memry Effect of Segmented Polyurethanes," J. Appl. Polym. Sci., 1997, 64, 1511–1516.

Takahashi, T., " Structure and Properties of Shape–Memory Polyurethane Block Copolymers,"; J. Appl. Polym. Sci., 1996, 60, 1061–1069.

Kim, B.K., et. al., "Polyurethane ionomers having shape memory effects," Polymer, 1998, 39 (13), 2803–2808.

Tobushi, H. et al., "Thermomechanical properties in a thin film of shape memory polymer of polyurethane series," Smart Mater.Struct., 1996, 5, 483–491.

Kim, B.K. et al., "Shape memory behavior of amorphous polyurethanes," J. Macrmol. Sci., —Physics, 2001, B40(6), 1179–1191.

Kim, B.K. and Lee, S.Y., Polyurethanes having shape memory effects,: Polymer, 1996, 39 (26), 5781–5793.

(List continued on next page.)

Primary Examiner—John M. Cooney, Jr.
(74) Attorney, Agent, or Firm—Brooks & Kushman P.C.

(57) ABSTRACT

The invention relates to a polymeric foam, preferably a polyurethane foam, having a glass transition temperature, $T_g$, which is at or above room temperature (21° C.). The foam is rigid at room temperature and elastic above the $T_g$. The foam has shape memory such that when it is deformed at a temperature above the $T_g$ and the temperature is then lowered to room temperature or below, the foam retains its deformed shape, and when the temperature is then raised above the $T_g$ the foam returns substantially to its original shape. In other words, the foam possesses hibernated elastic memory in the rigid state. The foam is also hydrophobic, which allows it to be used in many applications where hydrophilic foams are unsuitable.

24 Claims, 1 Drawing Sheet

OTHER PUBLICATIONS

Li, F., et al., "Polyurethane/Conducting Carbon Black Composites: Structure, Electric Conductivity, Strain Recovery Behavior, and Their Relationships," J. Appl. Polym. Sci., 2000, 75, 68–77.

"Cold Hibernated Elastic Memory (CHEM) Self–Deployable Structures", SPIE '99 International Symposium on Smart Structures and Materials, Mar. 1999.

Hanschke, E., et al, Clear Nonionic Polyurethane hydrogels For Biomedical Applications, New Orleans, Proceedings of the SPI 34$^{th}$ Annual Technical/Marketing Conference, p. 94, (1992).

Harrington, R., et al, "Chapter 9: Slabstock Foam" in: Flexible Polyurethane Foams (United States, The Dow Chemical Company; (1997) p. 9.30.

Frisch, K.C., "Chapter 31: High–Performance Polyurethanes" in: Hatada, K., et al., Macromolecular Design of Polymeric Materials (New York, Marcel Dekker;(1997), p. 529.

Saunders, J.H. and Frisch, K.C., "Chapter VII: Flexible Foams" in: Polyurethanes, Chemistry and Technology (New York, John Wiley & Sons,(1964), p. 173.

FOAMS HAVING SHAPE MEMORY

CROSS-REFERENCE TO RELATED APPLICATION

This application claims the benefit of U.S. provisional application Serial No. 60/249,975, filed Nov. 20, 2000.

TECHNICAL FIELD

This invention relates in general to foam compositions, and more specifically to foams that are elastic above the glass transition temperature ($T_g$) and rigid at room temperature, and that possess hibernated elastic memory in the rigid state.

BACKGROUND ART

U.S. Pat. No. 4,725,627 to Arnason et al. discloses a squeezable toy which is said to possess dimensional memory. The toy is made from an elastic material that will change dimension under force, and when the force is removed it will return to its original shape. There is no suggestion of a foam that is elastic above the $T_g$ and rigid at room temperature, and that possesses hibernated elastic memory in the rigid state.

U.S. Pat. No. 5,032,622 to Herrington et al. discloses a densifiable and re-expandable polyurethane foam. The $T_g$ of the foam is very broad, starting at a temperature well below room temperature. As a result, the foam retains some elastomeric character at room temperature—it is not rigid at room temperature. The foam can be flexed and compressed at room temperature. As an illustration, the patent describes crushing the foam at room temperature to mechanically open the cells of the foam. If the foam was rigid at room temperature, the crushing would break and destroy the foam.

U.S. Pat. No. 5,418,261 to Helsemans et al. discloses polyurethane foams having shape memory. The foams are prepared with polyoxyalkylene polyols containing oxyethylene residues. The polyols have an average oxyethylene content of at least 86% by weight. Foams prepared with oxyethylene based polyols have various disadvantages, such as hydrophilicity and other shortcomings, that limit the applications of the foams.

"Cold hibernated elastic memory (CHEM) self-deployable structures", Sokolowski et al., SPIE '99 International Symposium on Smart Structures and Materials, Mar. 1–5, 1999, describes shape memory polymeric foams and structures made with the foams. There is no disclosure of the chemical structure of the foams.

SUMMARY OF THE INVENTION

The invention relates to a polymeric foam, preferably a polyurethane foam, having a glass transition temperature, $T_g$, which is at or above room temperature (21° C.). The foam is rigid at room temperature and elastic above the $T_g$. The foam has shape memory such that when it is deformed at a temperature above the $T_g$ and the temperature is then lowered to room temperature or below, the foam retains its deformed shape, and when the temperature is then raised above the $T_g$ the foam returns substantially to its original shape. In other words, the foam possesses hibernated elastic memory in the rigid state. The foam is also hydrophobic, which allows it to be used in many applications where hydrophilic foams are unsuitable.

DETAILED DESCRIPTION OF THE PREFERRED EMBODIMENTS

Figure 1:
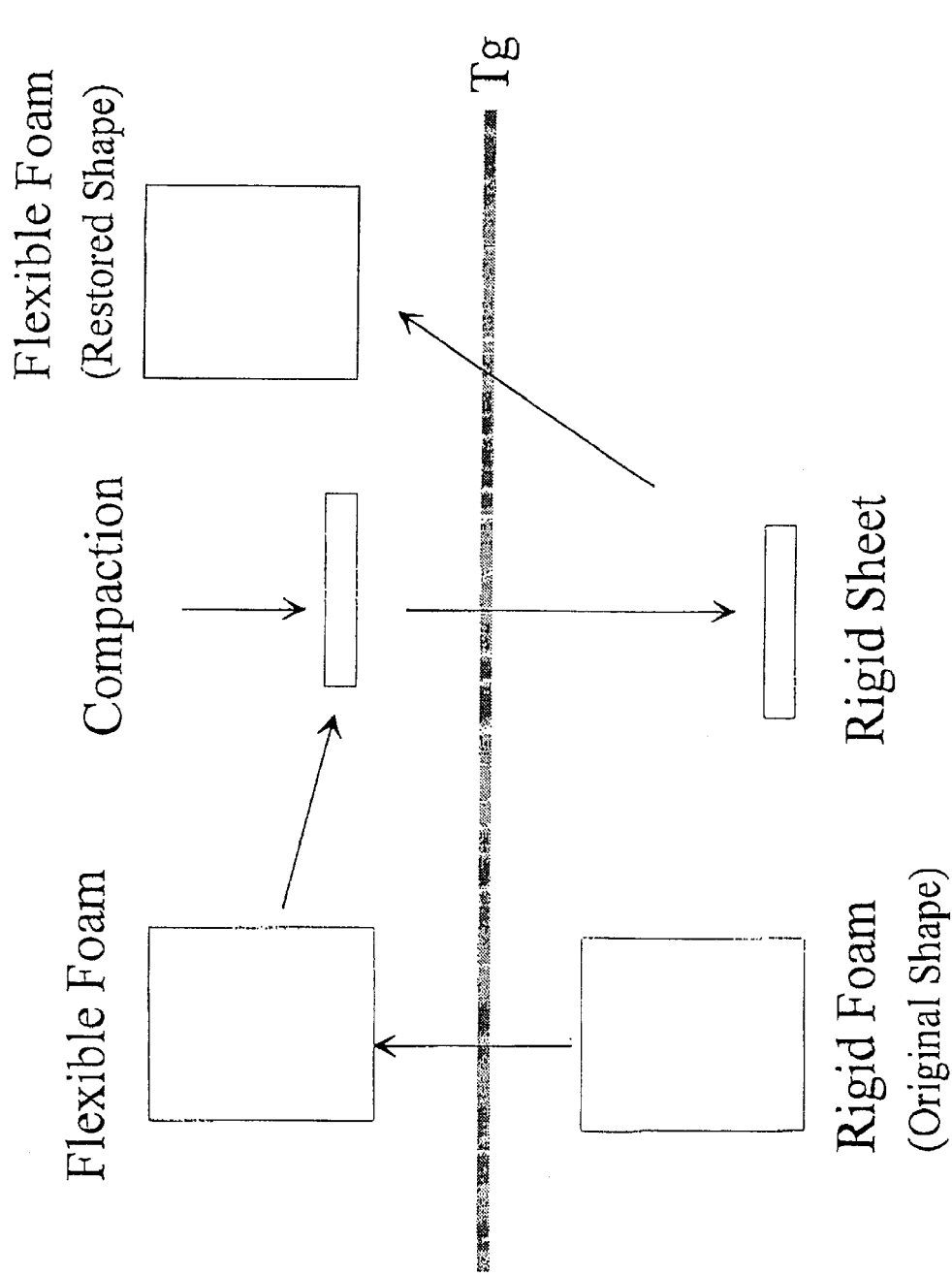
FIG. 1 is a diagram illustrating a shape memory cycle of a foam according to the invention.

The present invention provides polymeric foams, preferably polyurethane foams, that are elastic (flexible) above the glass transition temperature ($T_g$) and rigid at room temperature, and that possess hibernated elastic memory in the rigid state. The elastic memory of these foams allows repeated shape changes and shape retention.

As illustrated in FIG. 1, an example of a foam according to the invention is shaped as a block in its original shape. The illustrated foam is rigid at room temperature, because the $T_g$ of the foam is above room temperature. When the temperature of the foam block is brought above the $T_g$, the foam becomes flexible. The flexibility of the foam block allows it to be compacted into a flexible sheet. When the temperature of the flexible sheet is brought to room temperature (below the $T_g$), the sheet becomes rigid. No external force is required to keep the sheet in its compacted shape, because it is "frozen" in that shape. When the temperature of the sheet is brought above the $T_g$, the sheet becomes flexible again and it expands to restore its original shape in the form of a block. The restoration of the foam to its original shape is referred to as "shape memory".

The phenomenon illustrated in FIG. 1 is controlled by polymer network structure. The elastic modulus of the polymer is low above the $T_g$. In the elastic state, the foam can be easily deformed by application of external force, and the polymer chains can be oriented in the direction of deformation. When the temperature is lowered below the $T_g$ the polymer motion (micro-Brownian motion) will be frozen and the polymer chain orientation and deformation will be fixed. When the foam is heated above the $T_g$, the micro-Brownian movement starts again, the polymer chains lose their orientation and the foam will recover its original shape. Upon cooling below the $T_g$, the foam will become rigid, maintaining the original shape.

The polymeric foam of the invention has a glass transition temperature ($T_g$) of at least about 21° C. so that the foam is rigid at room temperature. Preferably, the foam has a $T_g$ of at least about 35° C., and more preferably at least about 40° C. The rigidity of the foam at room temperature allows it to be used in many applications in which an elastic foam would be unsuitable. Preferably, the rigid foam is substantially uncompressible at room temperature without structural damage.

Preferably, the foam of the invention has an open cell structure. The open cell structure can be achieved in various ways, for example by appropriate selection of cell openers and/or surfactants, or by standard reticulation (elimination of cell windows) methods applied on foams at flexible (elastic) state above the $T_g$. The open cell structure of the foam allows it to be compressed to much less than its original volume.

The compressed foam can be transported and stored at less expense than a fully expanded foam. Preferably, the foam can be compressed to less than about 20% of its original volume, more preferably less than about 10%, and most preferably about 5% or less. The foam will recover its original volume when its temperature is raised above the $T_g$.

Preferably, the polymeric foam has good heat resistance so that it can go through multiple cycles of shape changes without damage to its structure. Preferably, the foam is substantially undamaged at a temperature of 120° C. The good heat resistance of the foam allows it to be used at high service temperatures, higher than standard polyurethane foams. The heat resistant foams can be used as rigid foams at room temperature or elastic (flexible) foams at high temperature.

The properties of the polymeric foam of the invention are achieved by careful selection of the components used to make the foam. The rigidity of a foam increases and its elasticity decreases with increasing crosslink density and increasing functionality of the components. As described above, the foam of the invention is rigid at room temperature (having a $T_g$ at or above room temperature) and elastic above the $T_g$. Ordinarily, the use of components having a low crosslink density and a low functionality would produce a foam that is elastic above room temperature, but that would not have sufficient rigidity at room temperature. Conversely, the use of components having a high crosslink density and a high functionality would ordinarily produce a foam that is rigid at room temperature, but that is not elastic above room temperature.

It has now been found that by the careful selection of the components, the crosslink density and functionality of the components can be decreased to produce a foam that is elastic above room temperature, while still producing a foam that is rigid at room temperature. In a preferred embodiment of a polyurethane foam according to the invention, the polyol used to prepare the foam is an aromatic polyester polyol. It has been found that the aromatic polyester polyol produces a foam having good rigidity and stiffness at room temperature, even when the polyol has a low functionality and a low crosslink density so that the foam is elastic above the $T_g$ (above room temperature). Preferably, the aromatic polyester polyol has a functionality between 2 and 3, more preferably between 2 and 2.3, and most preferably 2.

Some examples of suitable aromatic polyester polyols are ortophthalic diethylene glycol polyester polyols with functionality of 2, such as Stepanol PS-2002 (equivalent weight of 288) and Stepanol PS-1752 (equivalent weight 316) sold by Stepan Company. Other types of aromatic based polyester polyols can also be used for preparation of the foams of the invention, including terephthalate based polyols manufactured utilizing dimethyl terephthalate (such as Terate polyols, KOSA) or polyethylene terephthalate (such as Terol polyols, OXIDE).

In addition to the aromatic polyester polyols, polycarbonate polyols can also be used to prepare the foams of the invention, such as poly(cycloaliphatic carbonate) polyol PC 1667 (Stahl USA). These polyols are also characterized with great rigidity. Advantageously, aromatic polyester polyols and polycarbonate polyols produce a foam having good heat resistance.

A combination of aromatic polyester polyols and polycarbonate-based polyols, as well as mixtures of these polyols with other polyols such as polyether-based polyols, and mixtures of these polyols with chain extenders (e.g., short chain aromatic or aliphatic diols or diamines) can be used to prepare the foams of the invention. Preferred average functionality of polyol mixtures is between 2 and 4, more preferred between 2 and 3, and even more preferred between 2 and 2.3.

The polyol is reacted with an isocyanate in the preparation of the polyurethane foams of the invention. Preferably, the isocyanate is an aromatic isocyanate having a functionality between 2 and 3, more preferably between 2 and 2.7, and even more preferably between 2 and 2.4. Two examples of suitable aromatic isocyanates include Lupranate M10 (polymeric diphenylmethane diisocyanate having a functionality of 2.2 and an equivalent weight of 132) sold by BASF, and Isonate 50 O,P'" (2,4-/4,4'-diphenylmethane diisocyanate having a functionality of 2.0 and an equivalent weight of 125) sold by Dow. Some examples of chain extenders are ethylene glycol, 1,4-butanediol, hydroquinone (2-hydroxyethyl)ether, and aromatic secondary diamines such as Unilink 4200 (UOP).

In addition to the polyol and the isocyanate, the foams of the invention can also include other components typically used in foams, such as blowing agents, cell openers, catalysts and surfactants. Some examples of suitable blowing agents include water (reaction with isocyanate gives CO2), low-boiling organic compounds (e.g., hydrocarbons and halogenated hydrocarbons such as methylene chloride, dichlorofluoroethane, pentane, hexane, and various refrigerants), "azo" compounds which generate nitrogen, and the like.

An example of a suitable cell opener is Ortegol 501 (Goldschmidt).

Some examples of suitable catalysts include stannus octoate, tertiary amine compounds such as triethylene diamine, bis(dimethylaminoethyl)ether, and organometallic compounds.

Some examples of suitable surfactants include silicone surfactants and alkali metal salts of fatty acids.

EXAMPLES 1–6

| Foam Formulations of the Invention (Components in Grams) | | | | | | |
|---|---|---|---|---|---|---|
| Component | 1 | 2 | 3 | 4 | 5 | 6 |
| Polyol A | 50 | 50 | 50 | — | 50 | 50 |
| Polyol B | — | — | — | 50 | — | — |
| Polyol C | — | — | — | — | — | — |
| Surfactant | 0.5 | — | — | — | 0.5 | 0.17 |
| Cell Opener | — | — | — | — | — | — |
| Water | 2.0 | 2.0 | 2.0 | 2.0 | 2.0 | 0.8 |
| Blowing Agent | — | — | — | — | — | 14.0 |
| Catalyst A | 0.3 | 0.3 | 0.3 | 0.3 | 0.3 | 0.15 |
| Catalyst B | 0.08 | 0.05 | — | — | 0.05 | 0.05 |
| Isocyanate A | 52.2 | 52.2 | 52.3 | 50.2 | — | 34.7 |
| Isocyanate B | — | — | — | — | 49.5 | — |
| Properties | | | | | | |
| Isocyanate Index | 100 | 100 | 100 | 100 | 100 | 100 |
| Density (pcf) | — | 2.1 | 2.3 | 2.7 | 2.1 | 1.7 |
| $T_g$ (DSC) | — | — | — | — | — | — |
| $T_g$ (DMA) | — | — | — | — | — | — |

Polyol A: Stepanpol PS-2002, Stepan [ortophtalate-diethylene glycol polyester polyol (eq. wt. 288; functionality 2)]
Polyol B: Stepanpol PS-1752, Stepan [ortophtalate-diethylene glycol polyester polyol (eq. wt. 316; functionality 2)]
Polyol C: Terate 203, KOSA [terephthalate based polyol manufactured utilizing dimethyl terephthalate (eq.wt. 180; functionality 2.3)]
Surfactant: Dabco DC 193, Air Products (non-hydrolyzable silicone surfactant)
Cell Opener: Ortegol 501, Goldschmidt
Blowing Agent: Genetron 141-b, Allied Signal [dichlorofluoroethane]
Catalyst A: Dabco 33LV, Air products [33% triethylene diamine in dipropylene glycol]
Catalyst B: Niax A-1, Urethane Additives [70% bis(dimethylaminoethyl) ether and 30% dipropylene glycol]
Isocyanate A: Lupranate M10, BASF [polymeric diphenylmethane diisocyanate (eq. wt. = 132; functionality 2.2)]
Isocyanate B: Isonate 50 O,P", Dow [2,4-/4,4'-diphenylmethane diisocyanate (eq. wt. = 125; functionality 2.0)]
DSC: differential scanning calorimetry.
DMA: dynamic mechanical analysis.

EXAMPLES 7–12

| Foam Formulations of the Invention (Components in Grams) | | | | | | |
|---|---|---|---|---|---|---|
| Component | 7 | 8 | 9 | 10 | 11 | 12 |
| Polyol A | 50 | 50 | 50 | 50 | 50 | 50 |
| Polyol B | — | — | — | — | — | — |
| Polyol C | — | — | — | — | — | — |
| Surfactant | 0.17 | 0.17 | 0.25 | 0.25 | 0.25 | 0.25 |
| Cell Opener | 0.5 | 0.15 | 0.10 | 0.11 | 0.10 | 0.10 |
| Water | 0.8 | 0.8 | 0.4 | 0.4 | 0.1 | — |
| Blowing Agent | 14.0 | 14.0 | 14.0 | 14.0 | 14.0 | 14.0 |
| Catalyst A | 0.15 | 0.15 | 0.15 | 0.15 | 0.10 | 0.05 |
| Catalyst B | 0.05 | 0.06 | 0.10 | 0.10 | 0.10 | 0.10 |
| Isocyanate A | 34.7 | 34.7 | 26.7 | 28.9 | 24.4 | 23.0 |
| Isocyanate B | — | — | — | — | — | — |
| Properties | | | | | | |
| Isocyanate Index | 100 | 100 | 93 | 100 | 100 | 100 |
| Density (pcf) | 1.4 | 1.6 | 1.9 | 1.5 | 1.8 | 1.7 |
| $T_g$ (DSC) | 42° C. | — | 42° C. | 41° C. | 40° C. | 41° C. |
| $T_g$ (DMA) | 54° C. | — | 53° C. | 57° C. | 54° C. | 49° C. |

EXAMPLES 13–18

| Foam Formulations of the Invention (Components in Grams) | | | | | | |
|---|---|---|---|---|---|---|
| Component | 13 | 14 | 15 | 16 | 17 | 18 |
| Polyol A | — | — | — | — | — | — |
| Polyol B | — | — | — | — | — | — |
| Polyol C | 50 | 50 | 50 | 50 | 50 | 50 |
| Surfactant | 0.2 | 0.25 | 0.25 | 0.25 | 0.25 | 0.25 |
| Cell Opener | 0.5 | 0.5 | 0.5 | 0.2 | 0.1 | 0.2 |
| Water | 1.0 | 0.8 | 0.1 | 0.05 | — | 0.05 |
| Blowing Agent | 12 | 13 | 12 | 14 | 14 | 14 |
| Catalyst A | 0.4 | 0.25 | 0.2 | 0.05 | 0.05 | 0.05 |
| Catalyst B | 0.1 | 0.1 | 0.1 | 0.1 | 0.1 | 0.1 |
| Isocyanate A | 51.3 | 48.4 | 38.1 | 37.4 | 36.7 | — |
| Isocyanate B | — | — | — | — | — | 35.4 |
| Properties | | | | | | |
| Isocyanate Index | 100 | 100 | 100 | 100 | 100 | 100 |
| Density (pcf) | 2.0 | 1.8 | 1.9 | 1.7 | 1.8 | 2.0 |
| $T_g$ (DSC) | — | 73° C. | — | — | — | 69° C. |
| $T_g$ (DMA) | — | — | — | — | — | — |

Example 1

The foam is rigid at room temperature. The foam is flexible (elastic) at 80° C.—it cannot be fully compressed because of the partially closed cell structure.

Examples 2 and 3

The thermal characteristics of these foams were similar to that in Example 1. The cell structure was partially closed even though the surfactant was not used in these foam formulations.

Example 4

A coarse cell structure. Shape memory characteristics—rigid at room temperature, flexible and soft at 80° C.

Example 5

This foam was somewhat more friable at room temperature compared to those in Examples 1–4. The foam is flexible (elastic) and soft at 80° C.—it cannot be fully compressed because of the partially closed cell structure.

Example 6

Closed cell structure and slight shrinkage after aging for 15 hours at 105° C. The foam is flexible (elastic) and soft at 80° C.—it cannot be fully compressed because of the partially closed cell structure.

Example 7

Open and relatively coarse cell structure. The foam has memory shape characteristics. The foam in flexible state at 80° C. was compressed from 40 mm to 2 mm (95% deformation) and let to cool to the room temperature. Upon heating at 80° C., the original foam shape was restored (1,900% expansion).

Example 8

This foam has similar characteristics to that in Example 7. This foam also had open and relatively coarse cell structure even though smaller amount of cell opener was used compared to Example 7. However, the cell size in this foam was somewhat smaller compared to that in Example 7.

Example 9

This foam was prepared utilizing smaller amount of water and cell opener as well as lower isocyanate index compared to Examples 7 and 8. The foam cell structure was uniform and cell size much smaller compared to those in Examples 7 and 8. However, this foam exhibited slight deformation when exposed to elevated temperature, most probably because of the under index.

Example 10

This foam was prepared utilizing the same amount of components as in Example 9 with exception of the isocyanate. Isocyanate index in this foam was 100. This foam had uniform open cell structure and desirable shape memory properties with temperature.

Example 11

This foam was prepared with even smaller amount of water compared to Example 10. This foam had uniform open cell structure and desirable shape memory properties with temperature.

Example 12

This foam was prepared without water utilizing only physical blowing agent. This foam had uniform, very fine open cell structure and desirable shape memory properties with temperature.

Example 13–18

All foams were prepared utilizing aromatic polyester poyol of functionality 2.3 and polymeric isocyanate of functionality of 2.2 except the foam Example 18 that was prepared utilizing isomeric mixture of MDI of functionality 2.0 All foams exhibited desirable shape memory properties with temperature. Foams examples 16–18 had very fine and slightly closed cell structure that had to be open by crashing at temperature above 100° C. (at elastic state of the foams).

What is claimed is:

1. A crosslinked shape memory foam (SMF) polymeric composition produced by reacting an isocyanate and a polyol and having a glass transition temperature, $T_g$, which is at or above about room temperature (21° C.) the foam being rigid at about room temperature and elastic above about room temperature, the foam being hydrophobic, and the foam having shape memory such that when the foam is deformed at a temperature above the $T_g$ and the temperature is then lowered to room temperature or below the foam retains its deformed shape, and when the temperature is then raised above the $T_g$ the foam returns substantially to its original shape.

2. The crosslinked SMF polymeric composition as recited in claim 1, wherein the crosslinked SMF is a polyurethane foam.

3. The crosslinked SMF polymeric composition as recited in claim 2, wherein the polyol is comprised of an aromatic polyester polyol.

4. The crosslinked SMF polymeric composition as recited in claim 3, wherein the aromatic polyester polyol has a functionality of between 2 and 3.

5. The crosslinked SMF polymeric composition as recited in claim 4, wherein the aromatic polyester polyol has a functionality of between 2 and 2.3.

6. The crosslinked SMF polymeric composition as recited in claim 2, wherein the polyol is comprised of a polycarbonate polyol.

7. The crosslinked SMF polymeric composition as recited in claim 2, wherein the polyol is comprised of a polyether polyol.

8. The crosslinked SMF polymeric composition as recited in claim 2, wherein the poiyoi is comprised of a mixture of at least two polyols.

9. The crosslinked SMF polymeric composition as recited in claim 8, wherein the poiyoi mixture has an average functionality of between 2 and 4.

10. The crosslinked SMF polymeric composition as recited in claim 9, wherein the poiyoi mixture has an average functionality of between 2 and 3.

11. The crosslinked SMF polymeric composition as recited in claim 8, wherein the polyol mixture includes at least one of an aromatic polyester polyol and a polycarbonate polyol.

12. The crosslinked SMF polymeric composition as recited in claim 11, wherein the polyol mixture additionally includes a polyether polyol.

13. The crosslinked SMF polymeric composition as recited in claim 1, wherein the isocyanate is comprised of an aromatic isocyanate having a functionality of between 2 and 3.

14. The crosslinked SMF polymeric composition as recited in claim 1, wherein the polymeric composition is produced by reacting the isocyanate with the polyol and a chain extender.

15. The crosslinked SMF polymeric composition as recited in claim 1, wherein the crosslinked SMF has a substantially open cell structure.

16. The crosslinked SMF polymeric composition as recited in claim 1, wherein the crosslinked SMF has a $T_g$ of at least about 35° C.

17. The crosslinked SMF polymeric composition as recited in claim 1, wherein the crosslinked SMF is heat resistant such that the foam is substantially undamaged at a temperature of 120° C.

18. The cross linked SMF polymeric composition as recited in claim 1, wherein the rigidity of the crosslinked SMF at room temperature is such that the foam is substantially uncompressible without structural damage.

19. The crosslinked SMF polymeric composition as recited in claim 1, wherein the crosslinked SMF can be compressed to less than about 10% of its original volume and then expanded upon heating to return substantially to its original shape and the foam can undergo at least about 20 of the compression/decompression cycles.

20. The crosslinked SMF polymeric composition as recited in claim 1, wherein at least one of the isocyanate or the polyol has a functionality of greater than 2.

21. The crosslinked SMF polymeric composition as recited in claim 1, wherein the amount of the isocyanate to the polyol and other isocyanate reactive components is in an equivalent ratio of at least about 0.9:1.

22. The crosslinked SMF polymeric composition as recited in claim 1, wherein the polymeric composition is produced by reacting the isocyanate with the polyol and a crosslinking agent.

23. A crosslinked shape memory foam (SMF) polymeric composition produced by reacting an isocyanate and a aromatic polyester polyol and having a glass transition temperature, $T_g$, which is at or above about room temperature (21° C.), the foam being rigid at about room temperature and elastic above the $T_g$ (above about room temperature), the foam being hydrophobic, and the foam having shape memory such that when the foam is deformed at a temperature above the $T_g$ and the temperature is then lowered to room temperature or below the foam retains its deformed shape, and when the temperature is then raised above the $T_g$ the foam returns substantially to its original shape.

24. A crosslinked shape memory foam (SMF) polymeric composition produced by reacting an isocyanate and a polycarbonate polyol and having a glass transition temperature, $T_g$, which is at or above about room temperature (21° C.), the foam being rigid at about room temperature and elastic above the $T_g$ (above about room temperature), the foam being hydrophobic, and the foam having shape memory such that when the foam is deformed at a temperature above the $T_g$ and the temperature is then lowered to room temperature or below the foam retains its deformed shape, and when the temperature is then raised above the $T_g$ the foam returns substantially to its original shape.

* * * * *

UNITED STATES PATENT AND TRADEMARK OFFICE
CERTIFICATE OF CORRECTION

PATENT NO.    : 6,583,194 B2
DATED         : June 24, 2003
INVENTOR(S)   : Vahid Sendijarevic It is certified that error appears in the above-identified patent and that said Letters Patent is hereby corrected as shown below:

<u>Column 7,</u>
Lines 28, 31 and 34, delete "poiyoi" and insert therefor -- polyol --.

Signed and Sealed this

Twenty-fifth Day of November, 2003

JAMES E. ROGAN
*Director of the United States Patent and Trademark Office*